United States Patent [19]

Borgerding et al.

[11] Patent Number: 4,484,301
[45] Date of Patent: Nov. 20, 1984

[54] ARRAY MULTIPLIER OPERATING IN ONE'S COMPLEMENT FORMAT

[75] Inventors: William L. Borgerding, Minneapolis; Vithal R. Patel, New Brighton, both of Minn.

[73] Assignee: Sperry Corporation, New York, N.Y.

[21] Appl. No.: 242,214

[22] Filed: Mar. 10, 1981

[51] Int. Cl.³ .............................................. G06F 7/52
[52] U.S. Cl. .................................................... 364/760
[58] Field of Search ......................................... 364/760

[56] References Cited

U.S. PATENT DOCUMENTS

| | | | |
|---|---|---|---|
| 3,730,425 | 5/1973 | Kindell et al. | 364/760 |
| 3,840,727 | 10/1974 | Amdahl et al. | 364/760 |
| 4,153,938 | 5/1979 | Ghest et al. | 364/760 |
| 4,228,520 | 10/1980 | Letteney et al. | 364/760 |

*Primary Examiner*—David H. Malzahn
*Attorney, Agent, or Firm*—William C. Fuess; Kenneth T. Grace; Marshall M. Truex

[57] ABSTRACT

A method and apparatus for performing a two's complement, single or double precision digital multiply, whereby the multiplication is performed in a one's complement format in a gate array assembly and then converted to a two's complement format. The gate array assembly generally multiplying successive eight bit bytes of the multiplier two bits at a time in each of four ranks to the full width multiplicand and producing a partial sum and carry at the end of each cycle. Each partial sum and carry then being fedback, aligned and added into the partial sum and carry produced during the multiplication of the next successive multiplier byte, until the multiplication is complete and at which time the final partial carry is converted and added to the final partial product to produce the final product.

14 Claims, 12 Drawing Figures

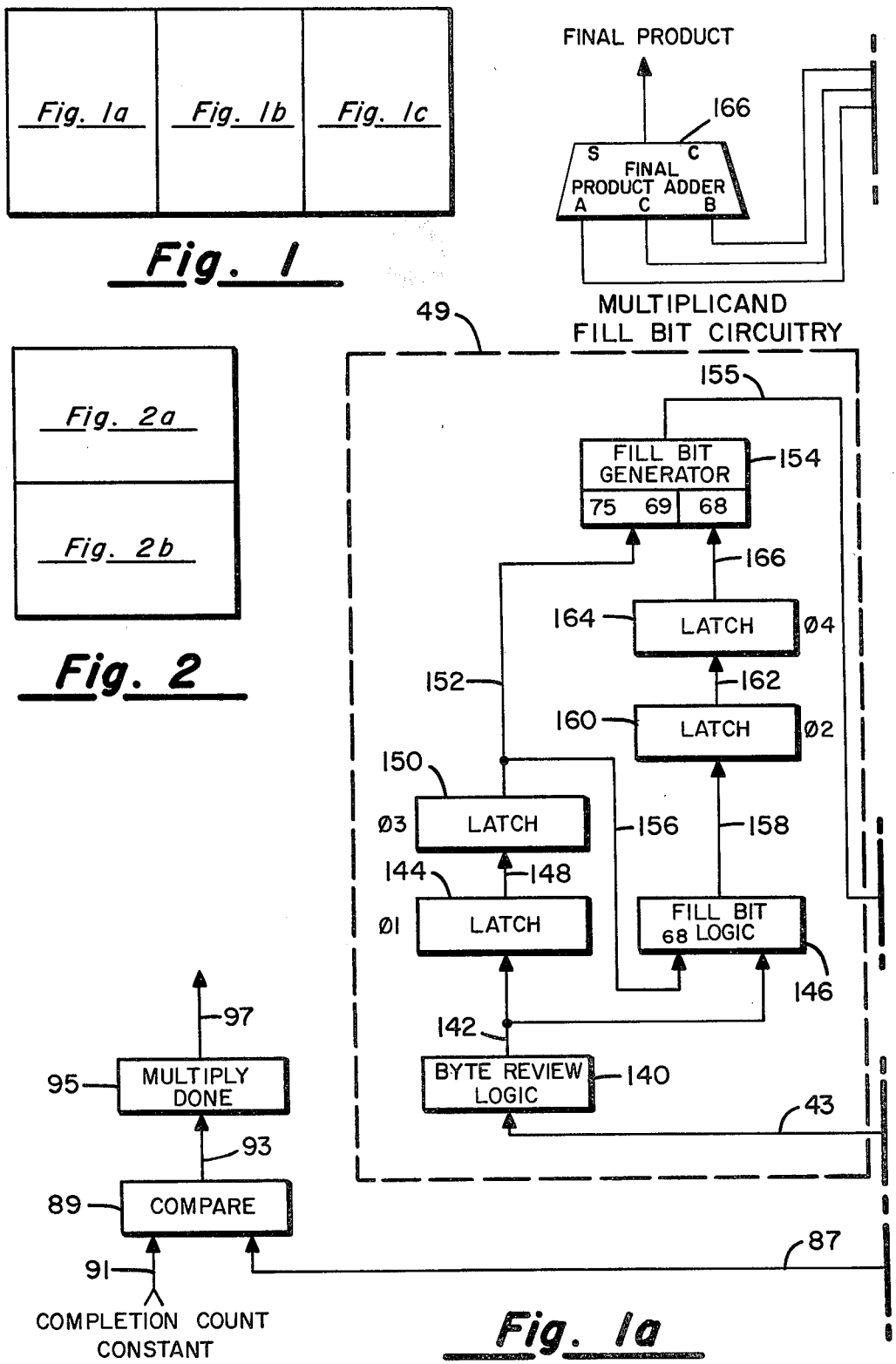

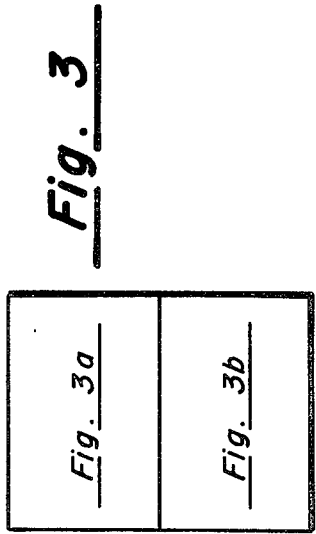
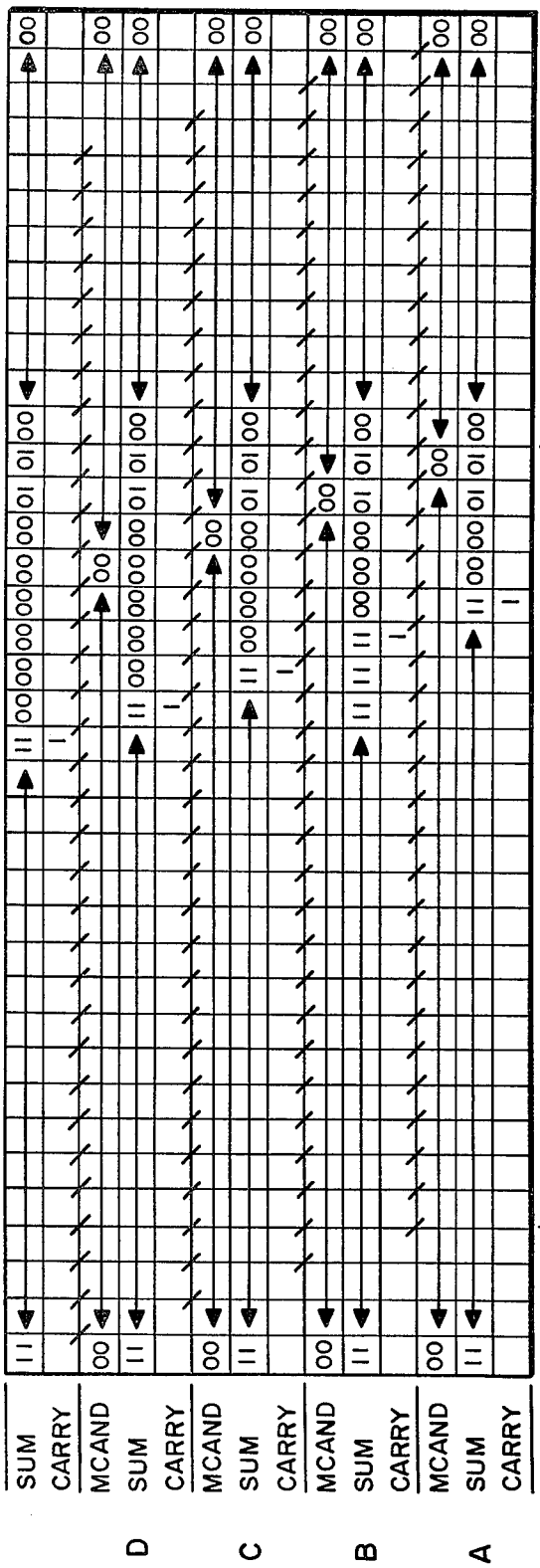

ARRAY MULTIPLIER OPERATING IN ONE'S COMPLEMENT FORMAT

BACKGROUND OF THE INVENTION

The present invention relates to digital apparatus for performing a binary multiplication operation. In particular, the present invention teaches a method and apparatus for improving the multiplication throughput within the arithmetic section of a digital computer. The method essentially consists of performing a one's complement multiplication of a multiplicand by successive eight bit bytes of the multiplier, positioning the successive partial products and carries and adding the final partial product to a converted final partial carry to produce the final product in a two's complement format.

The primary advantage of the present invention being an improved throughput in a computer's arithmetic section. Specifically, the present invention is able to perform an eight bit multiplication cycle in fifty nanoseconds. Whereas, using apparatus such as a Sperry Univac ® Series 1100/80 computer, it would take approximately one hundred nanoseconds to multiply the same multiplicand by only four multiplier bits. Therefore, a four-to-one improvement is achieved via the use of the present method and apparatus.

Previously too, the multiply operation was performed with SSI/MSI integrated circuits in a two's complement operation, that albeit produced the same result, but which circuitry was too slow for most scientific applications. It is therefore a primary object of the present invention to minimize the amount of time required to perform a multiplication operation.

It is a further object of the present invention to use gate arrays instead of SSI/MSI integrated circuitry to perform the multiplication operation. These objects and others are thus served via the present method and apparatus as described and claimed hereinafter.

SUMMARY OF THE INVENTION

A method and apparatus for performing a two's complement, binary multiplication, whereby the multiplication is performed piecemeal in a one's complement format with the multiplicand being multiplied by eight bit bytes of the multiplier in successive cycles of a gate array assembly. The gate array assembly comprising a plurality of gate arrays that are subdivided into four ranks with each rank performing a two-by-two addition of a successive two bits of the multiplicand with a successive partial sum and carry from the previous rank.

The bytes of the multiplier are first selected and processed to account for any binary 11 conditions that might exist in the successive two bit groupings of the multiplier. The preprocessed multiplier bits are then used to manipulate the multiplicand prior its addition to the partial sum and carry from the previous rank. The multiplicand is also left shifted two bit positions by each rank and the partial sum and carry are right shifted eight bits after each multiply cycle, thus ensuring the proper alignment of the multiplicand and partial sum bits. The partial sum and carry from the last cycle are then added together to produce the final product. Prior thereto though, the final partial carry is added to a multiplier correction carry so that the final product will be represented in a two's complement format.

Each gate array essentially comprising four two bit half-adders and four multiplicand selectors for manipulating the multiplicand bits in each rank, depending upon the binary value of that rank's multiplier bits. Each gate array also comprising four latches to accommodate necessary timing requirements and an adder for producing the final partial carry.

The apparatus further comprising logic circuitry for monitoring the gate array assembly so that appropriate fill bits are added during each cycle, depending upon the previous multiplier byte. The gate array assembly also containing duplicate gate arrays to ensure that carries are propagated smoothly between the printed circuit boards, upon which the gate array assembly is fabricated.

DESCRIPTION OF THE PREFERRED EMBODIMENT

Figure 1B:
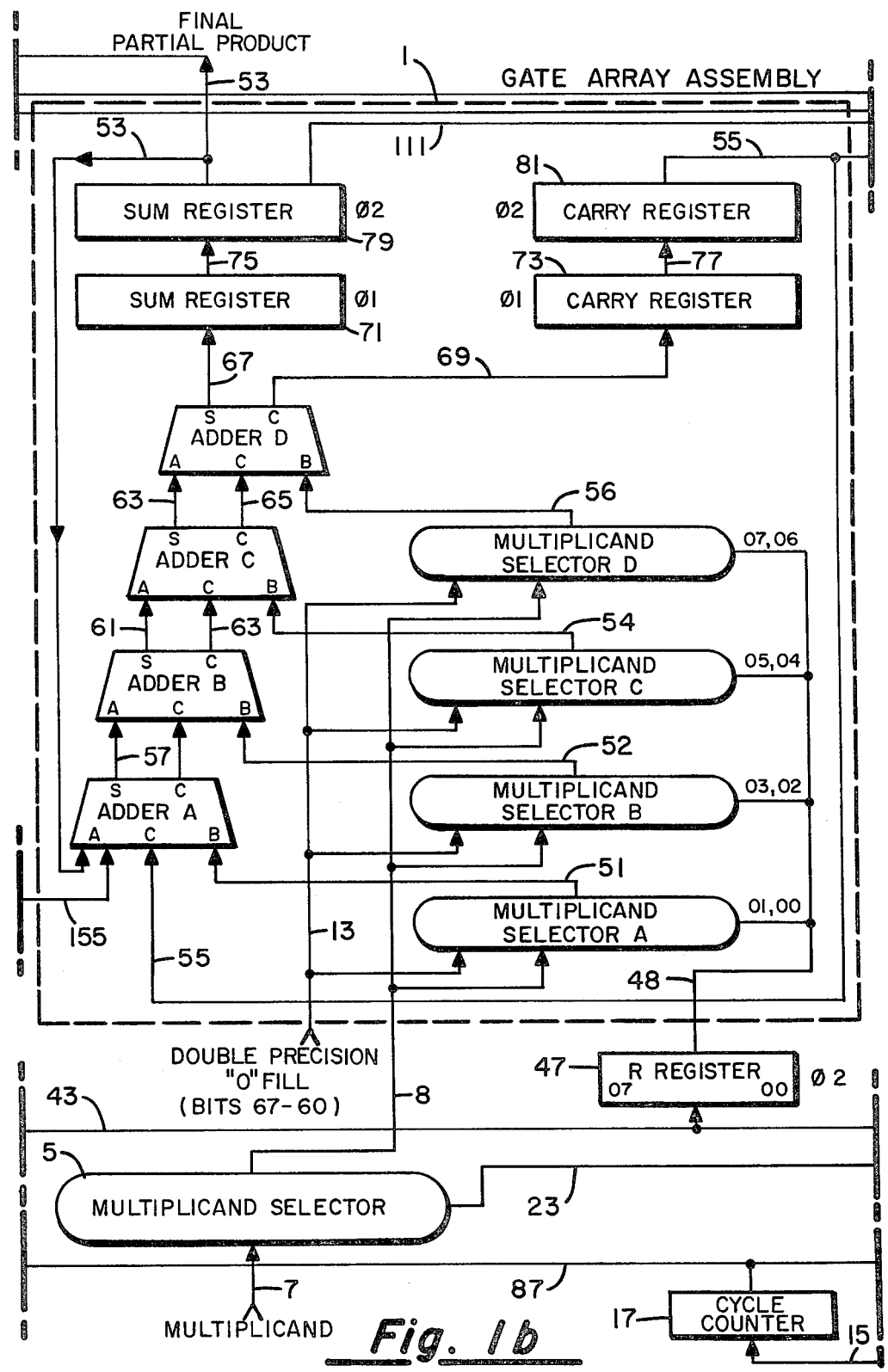
FIG. 1, comprised of FIGS 1a, 1b and 1c, is a block diagram of the gate array multiplier showing the essential elements contained therein.

Referring to FIG. 1 a functional block diagram is shown of the present gate array multiplication apparatus. The apparatus is essentially comprised of a multiplicand selector, a multiplier selector, a multiplier preprocessor, a gate array assembly, multiplicand fill bit circuitry and multiplier correction carry circuitry.

In the preferred embodiment of the apparatus was primarily designed for scientific applications, and therefore it was sized to accommodate a sixty bit mantissa when operated in the double precision, floating multiply (DPM) mode. This size however constrains the gate array assembly to forty gate arrays, but it is to be recognized that more or less gate arrays can be used depending upon the application. It is also to be noted that the apparatus is also operable to the additional single precision modes of multiply integer (MI) multiply single integer (MSI), and multiply fractional (MF), as well as a single precision floating multiply (FM).

The gate array assembly is generally structured into four ranks (i.e. A, B, C and D) and each rank is dependent on a partial sum and carry from the multiplication of two bits of the multiplier to the multiplicand in a preceding rank. The gate array assembly is thus capable of multiplying an eight bit multiplier to a full width multiplicand in one cycle. The partial sum and carry from one cycle then being used in the next successive cycle, until the full width of the multiplier has been selected and multiplied to the multiplicand.

Figure 2A:
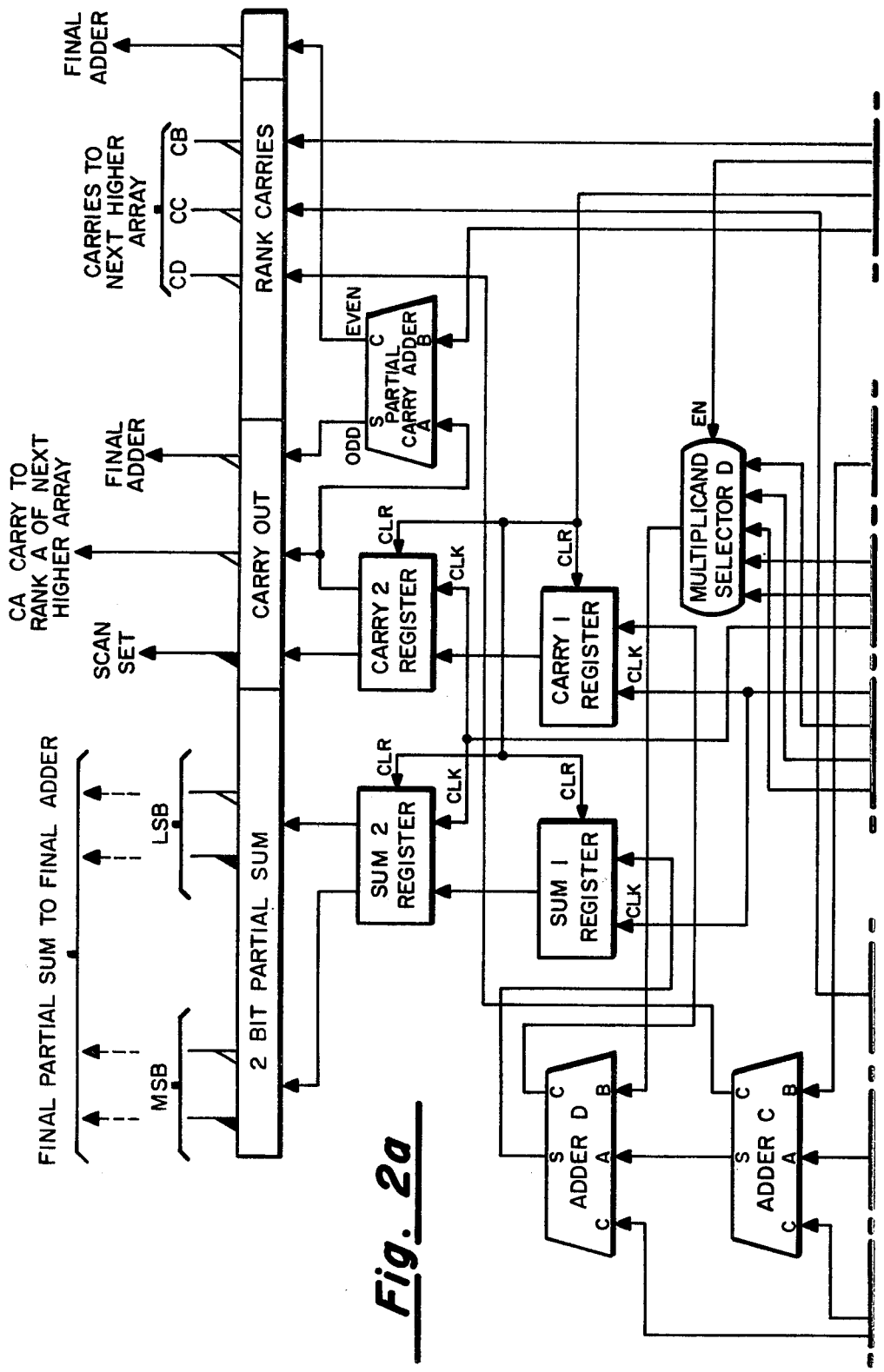
FIG. 2, comprised of FIGS. 2a and 2b, is a block diagram of one of the individual gate arrays contained within the gate array assembly of FIG. 1 showing the essential elements thereof as well as the various terminal designations.
Figure 2B:
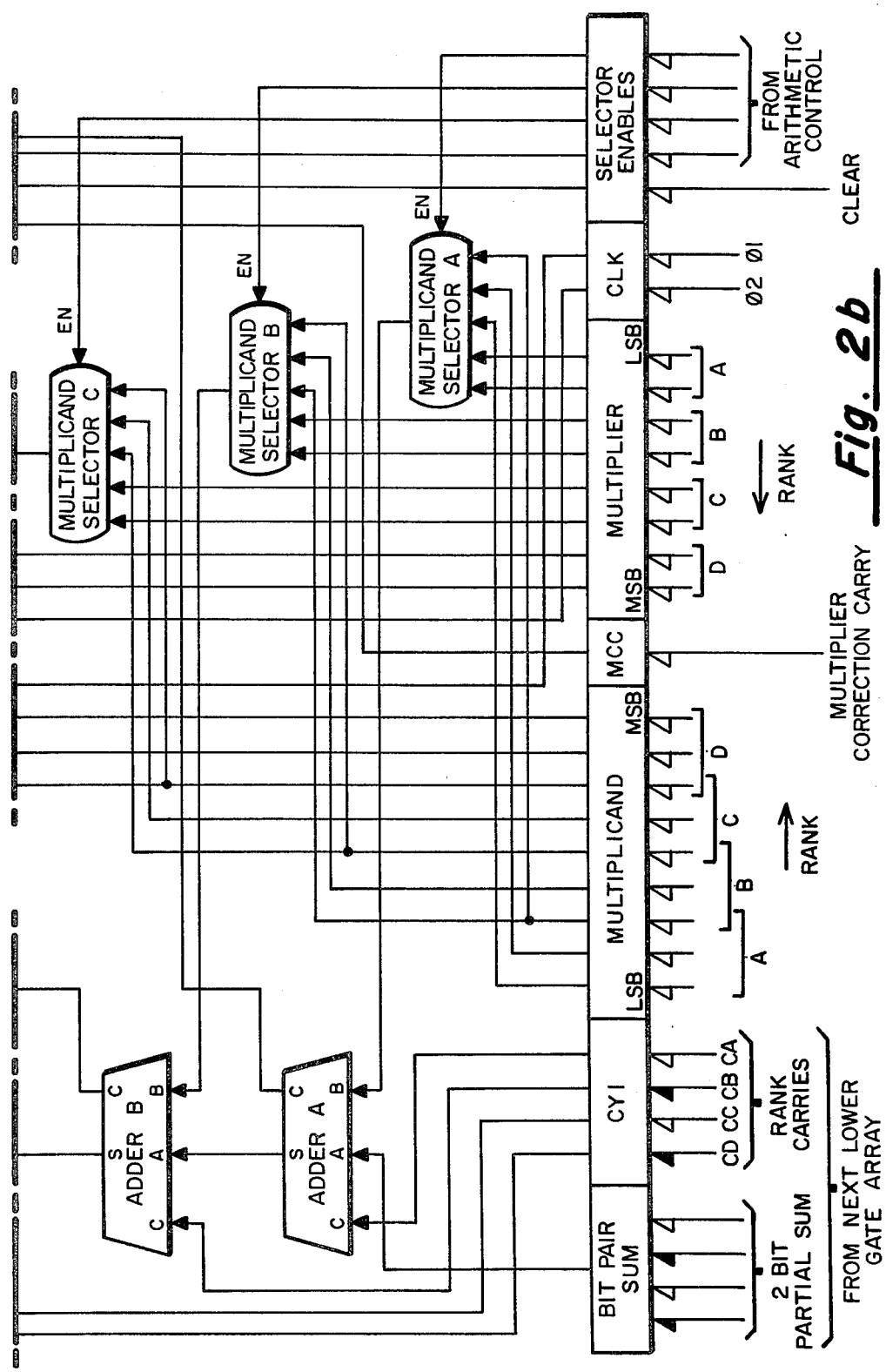

It is to be recognized too that individually each gate array is similarly structured, but that each gate array only accommodates two bit positions of the multiplicand. Referring to FIG. 2 an individual gate array is shown and which generally is comprised of four, two-by-two half-adders (i.e. adders A, B, C and D), four registers (i.e. sum 1, sum 2, carry 1 and carry 2) and the partial carry adder.

Figure 3B:
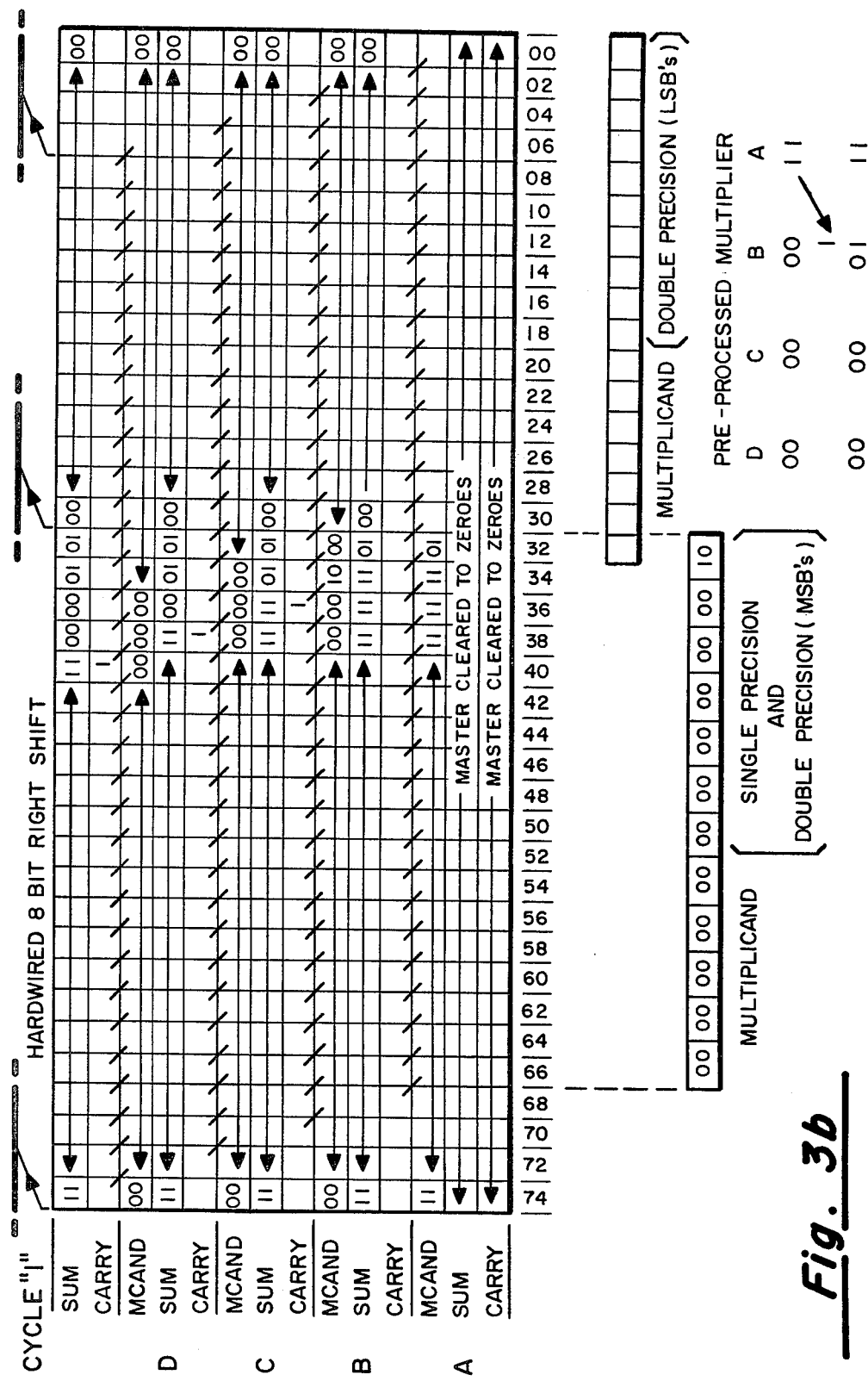
FIG. 3, comprised of FIGS. 3a and 3b, is an example of the typical sequence of events that would occur within the gate array multiplier during the multiplication of a multiplicand of two by a multiplier of three.

Referring now to FIG. 3—prior to describing in greater detail either FIGS. 1 or 2—and starting with FIG. 3b, the typical sequence of events which occur during a single precision, integer multiplication will be described with reference to the example contained therein.

Upon initiation of a multiplication operation, a master clear is performed within the gate array assembly 1 so that any partial sums or carries present within any ranks of the gate array assembly 1 are cleared. It is to be noted though that while each rank must accommodate the full width multiplicand, the multiplicand will be aligned differently depending upon whether a single precision or a double precision multiplication is to be performed. For a single precision operation (as in the present example) the multiplicand is generally positioned in the thirty-second through sixty-seventh bit positions. It should be noted also that for a single or double precision floating multiply operation only the mantissa is multiplied in the gate array assembly, since the characteristic is accommodated in the main adder of the arithmetic section. The zero through sixty-seventh bit positions are therefore reserved for double precision floating multiply operations, even though only the zero through sixtieth bit positions will be used. It is to be noted too that an additional four gate arrays or eight sign extend bits are provided to accommodate carries and partial sum bits that are generated in ranks B, C and D.

Figure 4:
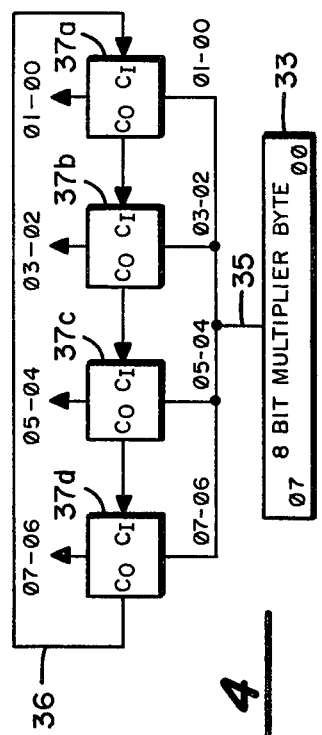
FIG. 4 is a block diagram of the multiplier byte preprocessor that is used to preprocess the multiplier bits prior to the use of the individual two bit groupings in the multiplicand selectors of the various ranks.

The multiplier bytes are next selected and preprocessed and during which operations successive two bit grouping of successive eight bit bytes of the multiplier are examined to determine if any binary 11 conditions are present. If a binary 11 is detected, a carry is generated and added to the next successive two bit grouping. After adding the carry, the resulting two bits are then examined and a carry is either generated or not and the process continues until all eight multiplier bits are sequentially examined. The first binary 11, however, remains unchanged. If a binary 11 results in the last two bit grouping, the carry is saved and added to the first two bits of the next eight bit byte of the multiplier. This preprocessing operation is thus performed on each eight bit byte of the multiplier as it is selected during each cycle of the multiplication operation. Attention is also called to FIG. 4 wherein the preprocessing circuitry is depicted and which figure will be described in more detail hereinafter.

Upon preprocessing the present abbreviated multiplier of 00000011, (i.e. twenty-eight binary 0's not being shown) the preprocessed multiplier will have a binary value of 00000111. The successive two bit groupings of this preprocessed multiplier are next used by the various ranks to manipulate the multiplicand prior to adding it to the partial sum and carry from the previous rank.

Depending upon the binary values of the successive two bit groupings of the preprocessed multiplier, the multiplicand bits are manipulated by each rank's multiplicand selectors A, B, C, and D within each gate array so that it is only necessary to perform a one's complement addition within the ranks associated A, B, C and D half-adders. The specific manipulation of the multiplicand bits within each of the multiplicand selectors being determined according to the conditions set out in the following Table 1.

TABLE 1

| MULTIPLIER BINARY VALUE (BIT POSITION) | | MULTIPLICAND SELECTOR OPERATION |
|---|---|---|
| MOST SIGNIFICANT | LEAST SIGNIFICANT | |
| 0 | 0 | No Selection |
| 0 | 1 | Same Bits |
| 1 | 0 | Left Shift 2 bits |
| 1 | 1 | Complement The Same Bits |

Thus from Table 1, each of the various permutations possible for the two bit multiplier groupings having been provided for. Since in the present case the first two bit grouping of the first eight bit byte of the multiplier is comprised of a binary 11, the table requires that the multiplicand be complemented and added to the sum and carry bits from the previous rank, which in this case are binary zeros. Upon the addition of the complemented multiplicand within the various A rank half adders, the successive two bit groupings of the partial sum from each gate array of the A rank are impressed on the C port of the B rank half adders. While in the present case, a carry is not generated; if a carry were generated, the carry would be coupled to the next most significant bit position in the B rank. Thus the A rank produces a partial sum which will be added to the manipulated multiplicand of the B rank during the next cycle. The B rank manipulation however will depend upon the next two successive bits (i.e. bit positions 2 and 3) of the eight bit byte of the preprocessed multiplier.

Since the next two bit grouping of the preprocessed multiplier is a binary 01, referring to Table 1, the multiplicand is selected "as is". The multiplication of these next successive two bits of the preprocessed multiplier, however, requires that a two bit left shift occur. The left shift is wired into the gate array assembly though, so that the B rank's manipulated multiplicand will be properly aligned with the A rank partial sum. This two bit left shift, however, necessitates the filling of the thirty-second and thirty-third bit positions with binary zeros, but which operation too has been hardwired into the gate array assembly 1. It should also be noted that the sixty-eighth through seventy-fifth bit positions or sign extend bit positions of the A rank's manipulated multiplicand are also filled with the pertinent data. This latter fill bit operation will however be described in more detail hereinafter with respect to the multiplicand fill bit circuitry.

Returning to the present example though, upon adding the A rank partial sum to the B rank's manipulated multiplicand, a carry is generated from the addition of the binary values contained in the thirty-fifth bit positions. This carry is then coupled to the next most significant bit position (i.e. the thirty-sixth bit position) in the C rank. The carry however is not added until the C rank's manipulated multiplicand and the B rank's partial sum are added within the C rank.

The C rank next performs a two bit left shift and fills the thirty-second through thirty-fifth bit positions with binary zeros, thus aligning its manipulated multiplicand. Since the fourth and fifth bit positions of the preprocessed multiplier are binary zeros, from Table 1, no multiplicand selection is made within the C rank multiplicand selectors and the thirty-sixth through seventy-fifth bit positions are filled with binary zeros. The partial sum and carry from the B rank are next added to this multiplicand and a carry is propagated to the thirty-eighth bit position.

The D rank next looks to the binary value of the sixth and seventh bit positions of the preprocessed multiplier to determine how the multiplicand should be manipulated. It also performs the necessary two bit left shift and fills the thirty-second through thirty-seventh bit positions with zeros. Because the sixth and seventh bit positions of the preprocessed multiplier are binary zeros, no selection is again made and the thirty-eight through seventy-fifth bit positions of the D rank are set to binary zeros. Upon the addition of the C rank's carry and partial sum with the D rank's manipulated multiplicand, the carry ripples through to the fortieth bit position and a D rank partial sum is produced. The multiplication of the multiplicand by the first eight bit byte of the the preprocessed multiplier is thus completed.

Referring to FIG. 3a and upon the selection of the next eight bit byte of the preprocessed multiplier during the next cycle, it is necessary to right shift the D rank partial sum by eight bit positions so that the partial sum and carry bits are properly aligned prior to performing the successive two bit multiplications within each of the ranks during this next cycle. It is to be noted though that this eight bit right shift is also hardwired into the gate array assembly and does not require a shift register.

Because the successive two bit groupings of the preprocessed multiplier for each of the remaining cycles are binary zeros, the partial sums for the A through D ranks for the second through fifth cycles will essentially be the same, with the exception that the carry will ripple through from rank to rank to the sixty-eighth bit position.

As the last cycle is completed and referring to FIG. 2, it is to be noted that as the D rank carries are shifted out of the carry registers 2 of each gate array, they are added in the individual partial carry adders to a multiplier correction carry value. The value of the multiplier correction carry is however dependent upon the binary values within the successive two bit groupings of the preprocessed multiplier. Essentially though, the multiplier correction carry acts to convert the one's complement value of the final partial product to a two's complement final product after the final partial product is added to the final partial carry. The details of this conversion and the multiplier correction carry circuitry will however be described in more detail hereinafter. Thus in the present example, the final partial carry has a value of 00000000 and the multiplier correction carry has a value of 00000001 so the final carry will have a value of 00000001.

Figure 1C:
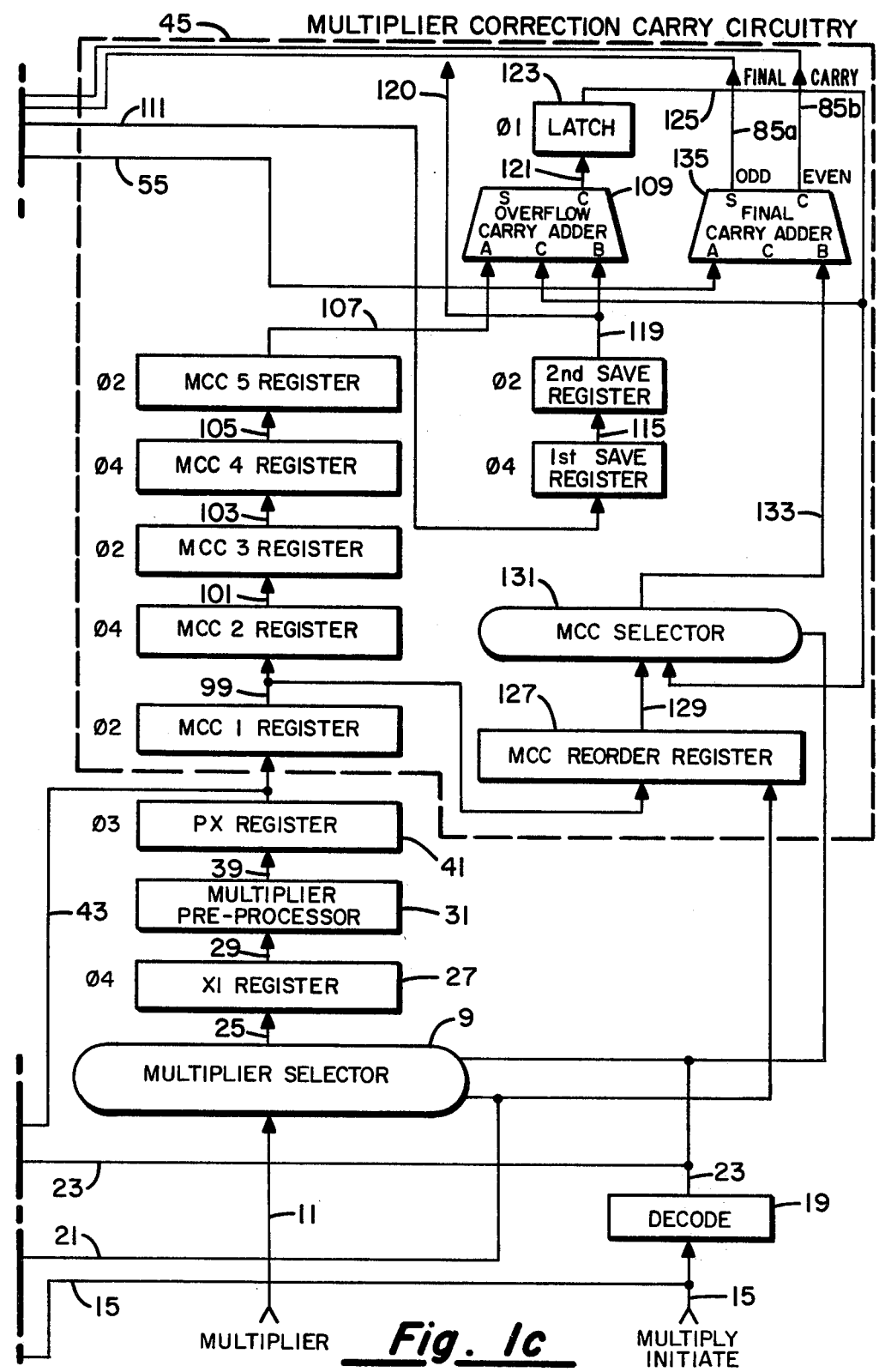

The final carry is next added to the binary 00000101, which will be resident and in the D rank after the fifth cycle, so that the final product will be produced. The final product for this example being a binary 00000110 or decimal 6 and which final product is represented in an octal format in the final product register. It is to be noted though that this final summation is performed in a full width, full adder that is not shown in the drawings. It is also to be noted that the final carry adder of FIG. 1c is essentially comprised of the partial carry adders from each gate array.

Referring again to FIG. 1 and recalling the above described example of FIG. 3, the apparatus of FIG. 1 will now be described in detail with respect to its operation during one cycle of the multiply operation. During this description, it should also be kept in mind that during each cycle of the multiplication operation, the apparatus is generally multiplying the full width multiplicand by an eight bit byte of the multiplier that has been preprocessed to account for any binary 11 conditions. Thus, it is first necessary that the full width multiplicand be impressed on the multiplicand selector 5 via line 7 and the full width multiplier be impressed on the multiplier selector 9 via line 11. The multiplicand selector 5 then couples successive three bit groupings of the multiplicand to the individual ranks of the multiplicand selectors A, B, C and D within each gate array of the gate array assembly 1. While it might be expected that only successive two bit groupings would be coupled to the individual multiplicand selectors, A, B, C and D the three bit groupings are required; since the various manipulations, as specified by Table 1 and which depend upon the value of the two multiplier bits coupled to each of the multiplicand selectors, require the next most significant bit, such as for the left shift when multiplying by a binary 10. At the same time a control signal is impressed on line 13, but only if a double precision multiply operation is to be performed, and which control signal causes the multiplicand selectors of the gate arrays associated with the sixty-seventh through sixtieth bit positions to be set to a logic zero, since the apparatus only accommodates sixty bit mantissa. Otherwise for a single precision multiply, as in the above example these bit positions will contain the multiplicand. It is also to be recalled that the sixty-eighth through seventy-fifth bit positions are initially filled with logic zeros, irrespective of whether a single precision or a double precision multiply is to be performed. The operation of the multiplicand fill bit circuitry however, will be described in more detail hereinafter. It should also be noted that five cycles are required to perform each multiplication with the exception of a single precision floating multiply, where only four cycle are required.

Meanwhile the multiplier selector 9 selects the first eight bit byte of the multiplier containing bit positions zero through seven for the first cycle of the multiply operation. This selection is initiated by the multiply initiate signal on line 15 which causes the cycle counter 17—which is comprised of a countdown type counter—to begin to count and the decoder 19—which decodes the multiply initiate signal—to determine which of the eight bit bytes of the multiplier is to be selected first. The multiplier selector 9 then responds to the cycle counter 17's control signal on line 21 and the decoder 19's control signal on line 23 and selects the first eight bit byte of the full width multiplier on line 11.

The selected multiplier byte is then shifted and latched in the X1 register 27 upon the occurrence of the phase 4 clock signal $\phi 4$. It is to be noted that while the system clock is not shown, it is essentially comprised of a four phase clock, each phase being indicated by $\phi 1$, $\phi 2$, $\phi 3$ or $\phi 4$. The multiplier byte is next shifted out of the X1 register 27 on line 29 to the multiplier preprocessor 31.

Attention is again called to FIG. 4 wherein the multiplier preprocessor 31 is shown in greater detail. The multiplier preprocessor 31 is essentially comprised of an eight bit register 33 coupled to four logic blocks 37a, 37b, 37c and 37d via line 35. Each selected multiplier byte is first stored in the register 33 and the successive two bit groupings (as shown) are then impressed on the logic blocks. The function of each logic block essentially then being to examine each successive two bit grouping to determine if a binary 11 is present. If a binary 11 is present, a carry is generated on the logic block's carry-out $C_O$ port and coupled to the carry-in $C_I$ port of the next most significant logic block. The carry is then added within the logic block to the associated two bit binary value from line 35 and this new value then becomes the two bit binary value that is shifted out in the indicated bit position of the preprocessed multiplier on line 39. If a carry is generated in the seventh bit position, the carry is saved and added to the least significant bit position of the next selected byte of the multiplier. Thus the multiplier preprocessor 31 essentially acts to anticipate the subtract operation— which corresponds to the addition of the one's complement value of the multiplicand or the multiplication by a binary 11—and prepare the multiplier so that the multiplicand selector can properly manipulate (i.e. complement) the multiplicand prior to adding the multiplicand in the proper rank of the gate array assembly 1.

Upon completing the preprocessing of the first eight bit byte of the multiplier, the preprocessed multiplier byte is transmitted via line 39 in response to the phase 3 clock signal $\phi 3$ to the PX register 41. The preprocessed multiplier byte is then latched in the PX register 41 and from which it is transmitted via conductor 43 to the multiplier correction carry circuitry 45, the R register 47 and the multiplicand fill bit circuitry 49.

It should be noted that the latching of the first preprocessed multiplier byte within the R register 47 is a critical event, since the speed with which this occurs determines the speed of the multiply apparatus. The selection of the next multiplier bytes being less critical, since they are selected and preprocessed while the multiplication of the previous byte is occurring.

Upon the occurrence of the next phase 2 clock signal $\phi 2$, the individual two bits groupings of the preprocessed multiplier are coupled from the R register 47 via line 48 to the multiplicand selectors A, B, C and D of the corresponding A, B, C and D ranks of the gate array assembly 1. The multiplicand selector A then responds to the binary information of the multiplier byte in the zero and first bit positions and manipulates the multiplicand in accordance with Table 1. Thus for the present one's complement addition: If a 00 multiplier is present, the A rank multiplicand selectors A will cause a binary 00 to be impressed via line 51 on the B ports of the half-adders in the A rank. If a binary 01 multiplier is present, the corresponding multiplicand "as is" will be impressed on the B ports. If a binary 10 multiplier is present, the multiplicand will be left shifted one position, thus implying a multiplication by two, as it is impressed on the B ports. If instead a binary 11 multiplier is present and which is partially anticipated within the multiplier preprocessor 31, the multiplicand selector A will complement the multiplicand and impress the complemented multiplicand on the B ports. Consequently, the various ranks' half-adders when adding the complemented multiplicands in effect are performing a one's complement subtraction and any necessary end around carries are stored in the multiplier correction carry register 127. These carries are later added to the multiplier correction carries, but which operation will be described in more detail hereinafter.

Since for the first cycle, the partial sum on line 53 to the A ports and the carry on line 55 to the C ports of the A rank half-adders are binary zeros, due to the master clear that was performed upon receipt of a multiply initiate on line 15, the A rank partial sum is reflective of the manipulated multiplicand on the B ports of the A rank. The two bit partial sum produced in the A rank half-adders is then impressed via line 57 on the A ports of the B rank half-adders. If any carries are produced in the A rank half-adders, they are then impressed on the C ports of the gate arrays containing the corresponding next most significant bits within the B rank. It is to be recalled too that the B rank multiplicand selectors, because the next two most significant bits are being multiplied to the multiplicand, perform a two bit left shift as the manipulated multiplicand is impressed on the B ports of the B rank half-adders. At the same time, the multiplier selector 5 causes the thirty-second and thirty-third bit positions within the B rank of the gate array assembly 1 to be filled with a binary 00. The B rank half-adders B then add the partial sum and carries from the A half-adders to the B rank manipulated multiplicand to produce a new partial sum and carry.

In a similar manner to that described for the A and B ranks, the multiplicand is multiplied to the next successive two bit groupings of the first byte of the multiplier in the C and D ranks. Similarly the manipulated multiplicands are aligned with the partial sums and the necessary fill bits are produced. A partial sum and carry representative of the multiplication of the full width multiplicand to the first eight bit byte of the multiplier are thus produced in the D rank of the gate array assembly 1.

The partial sum from the D rank, upon the occurrence of the phase 1 clock signal $\phi 1$, is next latched within the sum 1 register 71 and the carry is latched within the carry 1 register 73. Upon the occurrence of the phase 2 clock signal $\phi 2$, the D rank partial sum and carries are then transmitted via lines 75 and 77 to the sum 2 and carry 2 registers 79 and 81. At the same time the next byte of the preprocessed multiplier is shifted out of the R register 47 and the partial sum and carry are right shifted eight bit positions and fedback via lines 53 and 55 to the A and C ports of the A rank half-adders. Thus the next cycle of the multiply operation begins and which is detected upon the cycle counter 17's counting down by one and the multiplier selector's 9 selection of the third multiplier byte, since the second preprocessed multiplier byte will already be resident in the R register 47.

In a similar manner during the next successive cycles for each of the next successive bytes of the multiplier, the gate array assembly 1 multiplies the bytes of the multiplier to the multiplicand and aligns the resultant partial products and carries. Upon the completion of the last cycle, the final partial product and final carry are produced on lines 53 and on lines 85a and 85b, respectively and transmitted to the full adder 166. The full adder then adds the final partial product and final carry to determine the final product.

The cycle counter 17 by this time too should have counted down to zero and this condition will be transmitted via line 87 to the compare circuitry 89. The compare circuitry 89 then compares this condition to the completion count constant resident on line 91 from the arithmetic control section of the computer to determine if a match exists. If a match exists, a control signal is impressed via line 93 on the multiply done circuitry 95. In turn a control signal is produced by the multiply done circuitry 95 and which is transmitted back to the arithmetic control via line 97.

While the above description of a single precision operation is essentially complete, it is to be noted that the problem of converting the format of the final product was not described in detail. Prior to describing this circuitry though, it is to be noted that the apparatus, while described with reference to a single precision operation, operates essentially in the same fashion for a double precision operation, except that a wider multiplicand is then used (i.e. bit positions 00 to 59). In the double precision mode though, information is lost due to the eight bit right shift that occurs at the end of each cycle. It is thus necessary to add these least significant bits to any corresponding carries and to add any overflow carries that are produced back into the least significant bit position of the partial product so that the final partial product will be correct.

The multiplier carry circuitry 45 therefore generally performs these functions. During the single precision mode though the FIFO stack comprised of multiplier correction carry registers MCC 1, 2, 3, 4 and 5 is not used, since data is not lost upon each eight bit right shift. Thus during a single precision operation, the multiplier correction carry circuitry 45 primarily acts to convert the one's complement final partial carry to a two's complement final carry which when added to the final partial product in the final adder converts the final product to a two's complement format. During the double precision mode though, both portions of the multiplier carry circuitry 45 are operational and therefore the multiplier carry circuitry 45 will now be described with respect to a double precision operation.

During the double precision mode, the multiplier correction carry circuitry 45 accomplishes the above functions in the following manner. Referring to FIG. 1c, upon preprocessing each eight bit byte of the multiplier in the multiplier preprocessor 31 and shifting the preprocessed multiplier from the PX register 41, the MCC 1 register—which also contains a logic interface—acts to examine each of the successive two bit groups of the preprocessed multiplier bytes for any binary 11 conditions. If any binary 11's are detected, a binary 1 is produced and stored in the MCC 1 register in the least significant of the two bit positions at which the binary 11 occurred. These thus generated multiplier correction carries are then added to the final partial carry and used to enable the conversion of the final product forms from a one's complement to a two's complement format.

The successively generated multiplier correction carries from each byte of the multiplier are next sequentially shifted through the FIFO register stack via lines 99, 101, 103 and 105. The multiplier correction carries are then shifted upon the start of the third cycle via line 107, to the A port of the overflow carry adder 109 where they are added to the least significant eight bits of the partial sums from the sum register 79.

While the multiplier correction carries are being generated and shifted through the register stack, the least significant eight bits of the partial sum contained within the sum register 79 and which would otherwise be lost to the final product are transmitted via line 111 to the first save register 113 and from there via line 115 to the second save register 117. It is to be recognized though that valid data will not be contained within the second save register 117 until the third occurrence of the phase two clock cycle $\phi 2$ and at which time valid data will also be contained within the MCC 5 register.

Thus upon the occurrence of the third phase two clock cycle, and the least significant eight bits contained within the second save register 117 are impressed via line 119 on the B port of the final carry adder 109. The multiplier correction carries that were generated during the preprocessing of the first byte of the multiplier are then added to the least significant eight bits of the partial sum from the first cycle to determine if an overflow carry results. If an overflow carry results from the summation, the overflow carry is latched via the C port and line 121 into the overflow carry latch 123. The overflow carry is then saved within the overflow carry latch 123 until the occurrence of the next phase 1 clock signal $\phi 1$, when it is fed back via line 125 to the C port of the overflow carry adder 109. The overflow carry is then added at the least significant bit position during the next summation of the multiplier carries from the second byte with the next eight least significant bits. In this fashion the multiplier correction carries from the preprocessing are added back into the least significant eight bits of the partial sums that are generated within the gate array assembly 1 to ensure that valid data is not lost upon the occurrence of each eight bit right shift.

While the multiplier correction carries are being shifted through the FIFO register stack, each successive group of multiplier correction carries is also impressed via line 99 on the MCC reorder register 127. The successive eight bit groups of multiplier correction carries are then reordered within the MCC reorder register 127 in their sequential order under the control of the decode control signals on line 23, which also are controlling the multiplicand selector 5 and the multiplier selector 9. Upon the shifting out of the last group of multiplier correction carries into the MCC reorder register 127, the reordered multiplier correction carries for the sixty bit wide multiplier are shifted via line 129 into the MCC selector 131. Then upon the occurrence of an overflow carry from the addition of the multiplier correction carries for the fifth byte or last cycle with the least significant bits for the fifth cycle, this last overflow carry is impressed on the MCC selector 131 via line 125 and added to the least significant bit position of the reordered multiplier correction carry. The resulting contents of the MCC selector 131 are then impressed via line 133 on the B port of the final carry adder 135. At the same time the final partial carry contained within the carry register 81 is impressed via line 55 on the A port of the final carry adder 135. The addition of these two carries is then performed and a final carry is produced and transmitted via lines 85a and 85b to the final adder 166 where the full width, final partial sum and full width, final carry are added to produce the final product. It should be noted that the final carry adder 135 produces the final carry in two halves with the even bit positions being transmitted over line 85b and the odd bit position over 85a.

It should also be noted that during single precision operations the overflow carries are not generated by the overflow carry adder 109, since data is never resident in the least significant (i.e. 00 to 07) bit positions of the D rank until the last cycle. It should also be noted that the least significant eight bit positions of the final partial sum are hardwired to the multiplier correction carry circuitry 45, and therefore it is necessary to wait until this information is available from the second save register so that these bits of information can be transmitted to the final adder via line 120.

It should also be recalled that prior to multiplying each eight bit byte, it is necessary to fill the sixty-eighth through seventy-fifth bit positions to accommodate the sign extend feature of the apparatus. The multiplicand fill bit circuitry 49 generally performs this function by monitoring each preprocessed multiplier byte on line 43 and producing the necessary fill bits. These fill bits are then added to the A ports of the appropriate A rank half-adders.

Referring to FIG. 1a, the fill bit circuitry 49 accomplishes the above function in the following manner. The byte review logic circuitry 140 first monitors each eight bit byte of the preprocessed multiplier as it is received to determine if a binary 11 is present in any of the successive two bit groupings of the eight bit byte. It does this by breaking each eight bit byte into two four bit halves and then evaluating each half of each four bit group to determine if a binary 11 condition is present. If a binary 11 condition is detected anywhere within a preprocessed multiplier byte, a control signal is produced. The control signal is then used by each of the two branches of the multiplicand fill bit circuitry 49 as it determines the fill bits for the respectively indicated bit positions. The first branch thus determines the fill bits for the seventy-fifth through sixty-ninth bit positions and the second branch determines the fill bit for the sixty-eighth bit position.

Upon the occurrence of the phase 1 clock signal $\phi1$, the first branch responds to the control signal on line 142 and latches the control signal in latch 144. Upon the occurrence of the phase 3 clock $\phi3$, the control signal is then latched in latch 150. From there it is subsequently transmitted via line 152 to the fill bit generator 154. The fill bit generator 154 then responds to the signal from latch 150 and causes the sixty-ninth through seventy-fifth bit positions in the A rank to be filled with a binary value corresponding to the value stored in latch 150. It is to be noted though that at the same time the signal from latch 150 is impressed on the other input of the fill bit 68 logic circuitry 146.

Before the fill operation for the sixty-eighth bit position occurs though, the second branch and in particular the fill bit 68 logic circuitry 146 must determined what binary fill value is to be used for the sixty-eighth bit position. The fill bit 68 logic circuitry 146 responding to the signals on lines 156 and 142, and which signals are identical, therefore performs the following Boolean logic operation $$3D[k + 3A + 3B + 3C] + \overline{k}[\overline{3A} + \overline{3B} + \overline{3C} + \overline{3D}]$$

Where 3A, 3B, 3C and 3D are binary 1's, if their corresponding two bit groupings within the eight bit preprocessed multiplier byte are equal to an decimal 3 (i.e. a binary 11), otherwise they are binary 0's. And where the constant k is a binary 0, unless the previous eight bit preprocessed byte from the previous cycle had a binary 11 present in any of its two bit groups and in which event k will equal a binary 1. During the first cycle though, k will always be equal to a binary 0, and thus the second term will always be used during the first cycle and thereafter until a binary 11 is detected.

Upon the completion by the fill bit 68 logic circuitry 146 of the above logic operation, a binary 0 or 1 is determined and which value is successively latched upon the occurrences of the phase 2 and 4 clocks $\phi2$ and $\phi4$ within the latches 160 and 164 via lines 158 and 162.

The value contained within latch 164 is then impressed via line 166 on the fill bit generator 154, which responds to produce a corresponding binary 0 or 1 in the sixty-eighth bit position of the A rank of the gate array assembly 1.

Thus the fill bit generator 154 in response to the signals on lines 152 and 166 from the first and second branches produces the fill bits necessary to ensure that the partial sum in the A rank is correct. It should be noted too that the multiplicand fill bit circuitry 49, once it has sampled an eight bit preprocessed multiplier byte containing a binary 11, will continue to cause the sixty-eighth through seventy-fifth bit position of the partial sum to be filled with binary 1's until the sixty-eighth bit position changes.

Attention is also again called to FIG. 2 wherein a single gate array of the gate array assembly 1 is shown in detail. From this figure, it is to be noted that the individual gate arrays are essentially duplicates of the gate array assembly 1, but wherein each of the gate array's half adders A, B, C and D only accommodate two bits of the multiplicand and two bits of the multiplier. It is to be noted too that within each gate array, the multiplicand selectors A, B, C and D are coupled to the successively more significant three bit groupings of the multiplicand, with one bit from each selectors being shared by the previous selector.

Thus, the two bit left shift as previously mentioned is hardwired into the gate array assembly 1 and occurs automatically as the multiply operation ripples from rank to rank.

Figure 5:
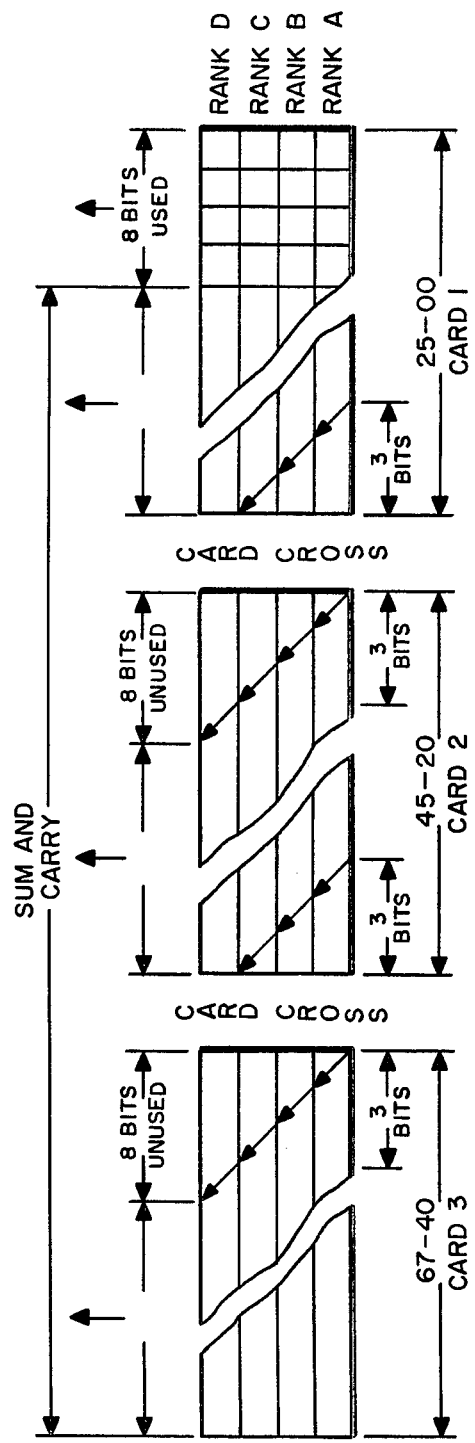
FIG. 5 shows the configuration of the printed circuit cards containing the present gate array multiplier and the relative positioning of the card crosses, duplicate bits etc.

Attention is also called to FIG. 5 wherein a general block diagram is shown of the three pc cards upon which the present gate array assembly 1 is wired. The cards contain forty gate arrays, of which thirteen gate arrays are contained on cards 1 and 2 and fourteen gate arrays on card 3. Thus, theoretically it is possible to accommodate a multiplicand, having an eighty bit width. But it is to be noted that due to timing requirements, it is necessary that a six bit duplication occur at the card crosses, thus three bits are duplicated at the end of card 1 and at the beginning of card 2 and the end of card 2 and the beginning of card 3. The duplications occurring in the twentieth through twenty-fifth and forty-fifth through fiftieth bit positions. It is also to be noted that the first eight bit positions on card 1 are the eight bits referenced with respect to the description of the multiplier carry circuit 45 that are lost during a double precision multiply.

As previously mentioned too, the present gate array assembly 1 was designed to accommodate a mantissa of sixty bits for a double precision floating multiply. Thus the forty gate arrays are wired so that thirty are used to accommodate the sixty bit mantissa, four to accommodate the eight bit fill (sign extend) requirement and six to generate the carries for the second and third pc cards. The upward pointing arrows of FIG. 5 merely indicate that it is necessary to perform a number of cycles before the final partial sum and carry are generated. The final product then being produced on a separate pc card in the full width, full adder 166.

While the above gate array multiplier has been described with reference to the preferred embodiment, it is to be noted that variations may suggest themselves to those of skill in the art upon a reading hereof. It is therefore asserted that the spirit and scope of the present invention must be interpreted in a broad sense from the following claims.

What is claimed is:

1. Given a binary multiplicand of less than or equal to $(x \cdot 2^z)$ bits in length, and given a binary multiplier of less than or equal to $(y \cdot 2^z)$ bits in length, a digital logic apparatus, organized as an array assembly of x identical subassemblies each of $2^z-1$ successive ranks, for performing a binary multiplication in y successive cycles, said performing being essentially by multiplying upon each of said y successive cycles in one's complement format the entire said multiplicand by successive ones of y equal parts of $2^z$ bits each of said multiplier, by positioning the successive partial products and carries developed thereby, and by adding the final partial product to the final partial carry in order to produce that final product which is the multiplication of said multiplicand and said multiplier, said apparatus comprising:

MULTIPLICAND SELECTOR means for selecting x successive one-bit-overlapping $(2^z+1)$-bit-each multiplicand parts of said multiplicand and distributing each said multiplicand part to successive said x identical subassemblies of said array assembly, and for further selecting successive one-bit-overlapping three-bit-each multiplicand subparts of said $(2^z+1)$-bit-each multiplicand parts and further distributing successive said multiplicand subparts to successive ones of $(z+1)$ MULTIPLICAND SELECTOR RANK N means which are within each said x identical subassemblies, which said successive ones of $(z+1)$ MULTIPLICAND SELECTOR RANK N means are uniquely associated with each corresponding one of said $(z+1)$ successive ranks of each said x identical subassemblies, said one-bit-overlapping three-bit-each multiplicand subparts of said one-bit-overlapping $(2^z+1)$-bit-each multiplicand parts thusly being of number $(z+1)$ subparts and being of the sequence (0,1,2), (2,3,4,), (4,5,6), and continuing to $(2^z-1, 2^z, 2^z+1)$;

MULTIPLIER SELECTOR means for selecting upon each of said y successive cycles successive multiplier parts of $2^z$ bits each from said multiplier;

MULTIPLIER PREPROCESSOR means for preprocessing successive said $2^z$ bit multiplier parts sequentially from least significant bits to most significant bits through operating upon successive bit pairs of said multiplier part by first-detecting any binary 11 condition in each successive two bit pair of said multiplier part and IF said binary 11 condition is first-detected THEN adding a carry to the least significant bit position of the next more significant two bit pair save that when said binary 11 condition is first-detected on the most significant bit pair of said multiplier part then said carry is added to the least significant bit position of the least significant bit pair of the next successive multiplier part ELSE doing nothing to said next more significant two bit pair, continuing until all said successive bit pairs of said multiplier part are sequentially operated upon to generate a $2^z$ bit preprocessed multiplier part;

preprocessed multiplier part distribution means for distributing $2^z-1$ successive two bit pairs of said $2^z$ bit preprocessed multiplier part to respectively successive said MULTIPLICAND SELECTOR RANK N means as are uniquely associated with said $z+1$ successive ranks, and as are contained within each, of said x identical subassemblies;

x identical subassemblies each of $2^z-1$ successive ranks for multiplying in one's complement format upon each of said y successive cycles successive said preprocessed multiplier parts to the entire said multiplicand, each said x identical subassemblies comprising:

$(z+1)$ MULTIPLICAND SELECTOR RANK N means which are uniquely associated with said $(z+1)$ successive ranks responsive to the binary value of corresponding successive two bit pairs of said total $2^z-1$ two bit pairs of said preprocessed multiplier part, received from said preprocessed multiplier distribution means, for manipulating corresponding ones of said $(z+1)$ multiplicand subparts in the manner corresponding to the following binary values 00 convert the multiplicand subpart to binary 0's and distribute to a corresponding RANK ADDER means 01 select the multiplicand subpart as is and distribute to said corresponding RANK ADDER means 10 left shift the multiplicand subpart 2 bit positions and distribute to said corresponding RANK ADDER means 11 form the one's complement of the multiplicand subpart and distribute to said corresponding RANK ADDER means in order to form manipulated multiplicand subparts;

$(z+1)$ RANK ADDER means which are uniquely associated with said $(z+1)$ successive ranks for serially adding in one's complement form by ranks the sum from the previous rank one of said RANK ADDER means, plus the carry from the previous rank one of said RANK ADDER means, plus said manipulated multiplicand subpart received from said corresponding one of said $(z+1)$ MULTIPLICAND SELECTOR RANK N means in order to form a sum and a carry which are received at the next higher rank, or in the case of the highest $(z+1)$'th rank and RANK ORDER means which sum and which carry are called a partial product and a partial carry;

partial product SUM REGISTER holding means for holding successive ones said partial products as are developed upon said y successive cycles and for providing each held said partial product right shifted $2^z$ bits back to the 0'th rank ones of said RANK ADDER means as a sum input, wherein after said y successive cycles said held one of said partial products will be said final partial product;

partial CARRY REGISTER holding means for holding successive ones of said partial carries as are developed upon said y successive cycles, and for providing each held said partial carry right shifted 2 bits back to said 0'th rank ones of said RANK ADDER means as a carry input, wherein after said y successive cycles said held one of said partial carries will be said final partial carry; and full final adder means for adding said final partial product and said final partial carry to produce said final product;

whereby said binary multiplication has been accomplished in one's complement format.

2. The digital logic apparatus as set forth in claim 1 wherein:

$x = 8$;
$y = 5$; and
$z = 3$;

whereby said binary multiplicand is less than or equal to $(x \cdot 2z) = 64$ bits in length;

whereby said binary multiplier is less than or equal to $(y \cdot 2^z) = 40$ bits in length;

whereby said digital logic apparatus is organized as an array assembly of $x = 8$ identical subassemblies;

whereby each of said 8 identical subassemblies consists of $2^{z-1} = 4$ successive ranks;

whereby said binary multiplication is performed in $y = 5$ successive cycles;

whereby said equal parts of said multiplier are in number $y = 5$ of $2^z = 8$ bits each;

whereby said MULTIPLICAND SELECTOR means does select $x = 8$ successive one-bit-overlapping $((2^z + 1) = 9)$-bit-each multiplicand parts;

whereby said MULTIPLICAND SELECTOR means does further distribute one-bit-overlapping three-bit-each multiplicand subparts of number $(z + 1) = 4$ which are the sequence $(0,1,2)$, $(2,3,4)$, $(4,5,6)$ and continuing to $((2^z - 1) = 7, 2^z = 8, 2^z + 1 = 9)$;

whereby said MULTIPLIER SELECTOR means does select upon each of said $y = 5$ successive cycle parts of $2^z = 8$ bits each from said multiplier;

whereby said MULTIPLIER PREPROCESSOR does preprocess successive said $2^z = 8$ bit multiplier parts in order to generate a $2^z = 8$ bit preprocessed multiplier part;

whereby said preprocessed multiplier part distribution means does distribute $2^{z-1} = 4$ successive two bit pairs of said preprocessed multiplier part;

whereby said $x = 8$ identical subassemblies each of $2^{z-1} = 4$ successive ranks are for multiplying in ones complement format upon each of $y = 5$ successive cycles successive said preprocessed multiplier parts to the entire said multiplicand;

whereby said MULTIPLICAND SELECTOR RANK N means within each of said $x = 8$ identical subassemblies are in number equal to $(z + 1) = 4$, and are responsive to the binary value of successive two bit pairs of said total $2^{z-1} = 4$ two bit pairs of said preprocessed multiplier part;

whereby said RANK ADDER means within each of said $x = 8$ identical subassemlies are in number equal to $(z + 1) = 4$, and do form a sum and a carry from the $(z + 1)$'th $= 4$'th rank which sum is said partial product and which carry is said partial carry;

whereby said partial product SUM REGISTER holding means will right shift each held said partial product $2^z = 8$ bits upon provision back to the 0'th rank ones of said RANK ADDER means and will after said $y = 5$ successive cycles hold said final partial product;

whereby said partial CARRY REGISTER holding means will right shift each held said partial carry $2^z = 8$ bits upon provision back to the 0'th rank ones of said RANK ADDER means, and will after said $y = 5$ successive cycles hold said final partial carry.

3. The digital logic apparatus as set forth in claim 1 wherein:

$x = 5$;
$y = 5$; and
$z = 3$;

whereby said binary multiplicand is less than or equal to $(x \cdot 2^z) = 40$ bits in length;

whereby said binary multiplier is less than or equal to $(y \cdot 2^z) = 40$ bits in length;

whereby said digital logic apparatus is organized as an array assembly of $x = 5$ identical subassemblies;

whereby each of said $x = 5$ identical subassemblies consists of $2^{z-1} = 4$ successive ranks;

whereby said binary multiplication is performed in $y = 5$ successive cycles;

whereby said equal parts of said multiplier are in number $y = 5$ of $2^z = 8$ bits each;

whereby said MULTIPLICAND SELECTOR means does select $x = 5$ successive one-bit-overlapping $((2^z + 1) = 9)$-bit-each multiplicand parts;

whereby said MULTIPLICAND SELECTOR means does further distribute one-bit-overlapping three-bit-each multiplicand subparts of number $(z + 1) = 4$ which are the sequence $(0,1,2)$, $(2,3,4)$, $(4,5,6)$ and continuing to $((2^z - 1) = 7, 2^z = 8, 2^z + 1 = 9)$;

whereby said MULTIPLIER SELECTOR means does select upon each of said $y = 5$ successive cycle parts of $2^z = 8$ bits each from said multiplier;

whereby said MULTIPLIER PREPROCESSOR does preprocess succesive said $2^z = 8$ bit multiplier parts in order to generate a $2^z = 8$ bit preprocessed multiplier part; whereby said preprocessed multiplier part distribution means does distribute $2^{z-1} = 4$ successive two bit pairs of said preprocessed multiplier part;

whereby said $x = 5$ identical subassemblies each of $2^{z-1} = 4$ successive ranks are for multiplying in ones complement format upon each of $y = 5$ successive cycles successive said preprocessed multiplier parts to the entire said multiplicand;

whereby said MULTIPLICAND SELECTOR RANK N means within each of said $x = 5$ identical subassemblies are in number equal to $(z + 1) = 4$, and are responsive to the binary value of successive two bit pairs of said total $2^{z-1} = 4$ two bit pairs of said preprocessed multiplier part;

whereby said RANK ADDER means within each of said $x = 5$ identical subassemblies are in number equal to $(z + 1) = 4$, and do form a sum and a carry from the $(z + 1)$'th $= 4$'th rank sum is said partial product and which carry is said partial carry;

whereby said partial product SUM REGISTER holding means will right shift each held said partial product $2^z = 8$ bits upon provision back to the 0'th rank ones of said RANK ADDER means and will after said $y = 5$ successive cycles hold said final partial product;

whereby said partial CARRY REGISTER holding means will right shift each held said partial carry $2^z = 8$ bits upon provision back to the 0'th rank ones of said RANK ADDER means, and will after said $y = 5$ successive cycles hold said final partial carry.

4. The digital logic apparatus as set forth in claim 1 wherein said x identical subassemblies each of $(z + 1)$ successive ranks, which each subassembly does in said $(z + 1)$ MULTIPLICAND SELECTOR RANK N means thereof manipulate said $(z + 1)$ multiplicand subparts which are of said sequence $(0,1,2)$, $(2,3,4)$, $(4,5,6)$, and continuing to $(2^z - 1, 2^z, 2^{z+1})$ thusly making that $(x \cdot 2^z)$ bits of multiplicand meaning the entire said multiplicand are manipulated in entire said x identical subassemblies, are further augmented, said augmented x identical subassemblies comprising:

x identical subassemblies each of $(z+1)$ successive ranks each in said $(z+1)$ MULTIPLICAND SELECTOR RANK N means thereof manipulating $(z+1)$ multiplicand subparts PLUS additional said identical subassemblies and/or fractionally wide portions thereof said subassemblies as occupy $2^z$ additional most significant bit positions, meaning that aggregate said additional subassemblies and/or fractional parts thereof do in aggregate have aggregate bit inputs, which aggregate bit inputs are called sign fill bit inputs, to said $(z+1)$ MULTIPLICAND SELECTOR RANK N means which are in bit number equal to $2^z$;

and which digital logic apparatus further comprises:

multiplicand fill bit means for monitoring each successive said two bit pair of said preprocessed multiplier part by second-detecting any binary 11 condition in each successive two bit pair of said preprocessed multiplier part and, responsively to said second-detecting maintaining correct said sign fill bit inputs to said additional subassemblies as does permit of proper sign extension as is utilized in floating point multiplication.

5. The digital logic apparatus as set forth in claim 1 which, intermediary between said partial CARRY REGISTER holding means and said full final adder means, further comprises:

final partial carry correction means for converting said one's complement format final partial carry to a two's complement format final partial carry by adding a binary one to the bit positions of said one's complement format final carry that have a relational correspondence to the least significant bit positions of each two bit pair of said preprocessed multiplier part in which a binary 11 was detected in said MULTIPLIER PREPROCESSOR means to occur;

whereby because said final product is produced by addition in said full final adder means of said final partial product and said final carry, said final product is converted into two's complement format.

6. The digital logic apparatus as set forth in claim 5 wherein:

$x=8$;
$y=5$; and
$z=3$;

whereby said binary multiplicand is less than or equal to $(x \cdot 2^z)=64$ bits in length;

whereby said binary multiplier is less than or equal to $(y \cdot 2^z)=40$ bits in length;

whereby said digital logic apparatus is organized as an array assembly of $x=8$ identical subassemblies;

whereby each of said 8 identical subassemblies consists of $2^{z-1}=4$ successive ranks;

whereby said binary multiplication is performed in $y=5$ successive cycles;

whereby said equal parts of said multiplier are in number $y=5$ of $2^z=8$ bits each;

whereby said MULTIPLICAND SELECTOR means does select $x=8$ successive one-bit-overlapping $((2^z+1)=9)$-bit-each multiplicand parts;

whereby said MULTIPLICAND SELECTOR means does further distribute one-bit-overlapping three-bit-each multiplicand subparts of number $(z+1)=4$ which are the sequence (0,1,2), (2,3,4), (4,5,6) and continuing to $((2^z-1)=7, 2^z=8, 2^z+1=9)$;

whereby said MULTIPLIER SELECTOR means does select upon each of said $y=5$ successive cycle parts of $2^z=8$ bits each from said multiplier;

whereby said MULTIPLIER PREPROCESSOR does preprocess successive said $2^z=8$ bit multiplier parts in order to generate a $2^z=8$ bit preprocessed multiplier part;

whereby said preprocessed multiplier part distribution means does distribute $2^{z-1}=4$ successive two bit pairs of said preprocessed multiplier part;

whereby said $x=8$ identical subassemblies each of $2^{z-1}=4$ successive ranks are for multiplying in ones complement format upon each of $y=5$ successive cycles successive said preprocessed multiplier parts to the entire said multiplicand;

whereby said MULTIPLICAND SELECTOR RANK N means within each of said $x=8$ identical subassemblies are in number equal to $(z+1)=4$, and are responsive to the binary value of successive two bit pairs of said total $2^{z-1}=4$ two bit pairs of said preprocessed multiplier part;

whereby said RANK ADDER means within each of said $x=8$ identical subassemblies are in number equal to $(z+1)=4$, and do form a sum and a carry from the $(z+1)$'th=4'th rank which sum is said partial product and which carry is said partial carry;

whereby said partial product SUM REGISTER holding means will right shift each held said partial product $2^z=8$ bits upon provision back to the 0'th rank ones of said RANK ADDER means and will after said $y=5$ successive cycles hold said final partial product;

whereby said partial CARRY REGISTER holding means will right shift each held said partial carry $2^z=8$ bits upon provision back to the 0'th rank ones of said RANK ADDER means, and will after said $y=5$ successive cycles hold said final partial carry.

7. The digital logic apparatus as set forth in claim 5 wherein:

$x=5$;
$y=5$; and
$z=3$;

whereby said binary multiplicand is less than or equal to $(x \cdot 2^z)=40$ bits in length;

whereby said binary multiplier is less than or equal to $(y \cdot 2^z)=40$ bits in length;

whereby said digital logic apparatus is organized as an array assembly of $x=5$ identical subassemblies;

whereby each of said $x=5$ identical subassemblies consists of $2^{z-1}=4$ successive ranks;

whereby said binary multiplication is performed in $y=5$ successive cycles;

whereby said equal parts of said multiplier are in number $y=5$ of $2^z=8$ bits each;

whereby said MULTIPLICAND SELECTOR means does select $x=5$ successive one-bit-overlapping $((2^z+1)=9)$-bit-each multiplicand parts;

whereby said MULTIPLICAND SELECTOR means does further distribute one-bit-overlapping three-bit-each multiplicand subparts of number $(z+1)=4$ which are the sequence (0,1,2), (2,3,4), (4,5,6) and continuing to $((2^z-1)=7, 2^z=8, 2^z+1=9)$;

whereby said MULTIPLIER SELECTOR means does select upon each of said $y=5$ successive cycle parts of $2^z=8$ bits each from said multiplier;

whereby said MULTIPLIER PREPROCESSOR does preprocess successive said $2^z=8$ bit multiplier parts in order to generate a $2^z=8$ bit preprocessed multiplier part;

whereby said preprocessed multiplier part distribution means does distribute $2^{z-1}=4$ successive two bit pairs of said preprocessed multiplier part;

whereby said $x=5$ identical subassemblies each of $2^{z-1}=4$ successive ranks are for multiplying in ones complement format upon each of $y=5$ successive cycles successive said preprocessed multiplier parts to the entire said multiplicand;

whereby said MULTIPLICAND SELECTOR RANK N means within each of said $x=5$ identical subassemblies are number equal to $(z+1)=4$, and are responsive to the binary value of successive two bit pairs of said total $2^{z-1}=4$ two bit pairs of said preprocessed multiplier part;

whereby said RANK ADDER means within each of said $x=5$ identical subassemblies are in number equal to $(z+1)=4$, and do form a sum and a carry from the $(z+1)$'th$=4$'th rank which sum is said partial product and which carry is said partial carry;

whereby said partial product SUM REGISTER holding means will right shift each held said partial product $2^z=8$ bits upon provision back to the 0'th rank ones of said RANK ADDER means and will after said $y=5$ successive cycles hold said final partial product;

whereby said partial CARRY REGISTER holding means will right shift each held said partial carry $2^z=8$ bits upon provision back to the 0'th rank ones of said RANK ADDER means, and will after said $y=5$ successive cycles hold said final partial carry.

8. The digital logic apparatus as set forth in claim 5 wherein said x identical subassemblies each of $(z+1)$ successive ranks, which each subassembly does in said $(z+1)$ MULTIPLICAND SELECTOR RANK N means thereof manipulate said $(z+1)$ multiplicand subparts which are of said sequence (0,1,2), (2,3,4), (4,5,6), and continuing to $(2^z-1, 2^z, 2^{z+1})$ thusly making that $(x \cdot 2^z)$ bits of multiplicand meaning the entire said multiplicand are manipulated in entire said x identical subassemblies, are further augmented, said augmented x identifical subassemblies comprising:

x identical subassemblies each of $(z+1)$ successive ranks each in said $(z+1)$ MULTIPLICAND SELECTOR RANK N means thereof manipulating $(z+1)$ multiplicand subparts PLUS additional said identical subassemblies and/or fractionally wide portions thereof said subassemblies as occupy $2^z$ additional most significant bit positions, meaning that aggregate and additional subassemblies and/or fractional parts thereof do in aggregate have aggregate bit inputs, which aggregate bit inputs are called sign fill bit inputs, to said $(z+1)$ MULTIPLICAND SELECTOR RANK N means which are in bit number equal to $2^z$;

and which digital logic apparatus further comprises:

multiplicand fill bit means for monitoring each successive said two bit pair of said preprocessed multiplier part by second-detecting any binary 11 condition in each successive two bit pair of said preprocessed multiplier part and, responsively to said second-detecting maintaining correct said sign fill bit inputs to said additional subassemblies as does permit of proper sign extension as is utilized in floating point multiplication.

9. The digital logic apparatus as set forth in claim 5 wherein said final partial carry correction means further comprises:

overflow carries means, responsive to the preprocessing of each said $2^z$ bit multiplier part of said MULTIPLIER PREPROCESSOR means, and responsive to the $2^z$ least significant bits of each successive partial product as held in said partial product SUM REGISTER means, for developing upon each of said y successive cycles an overflow carry which is indicative of an overflow carry which WOULD have been resultant from the addition, upon the next subsequent cycle, of the partial product held within said partial product SUM REGISTER means when provided back as sum input to said 0'th rank ones of said RANK ADDER means, SAVE that such overflow carry IS lost because said RANK ADDER means of said 0'th rank have, in aggregate within all said x identical subassemblies, an aggregate bit width of $x \cdot 2^z$ bits and, resultantly to right shifting of $2^z$ bits between said partial product SUM REGISTER holding means and said 0'th rank ones of said RANK ADDER means, the $2^z$ least significant bits are right shifted beyond the physical boundaries of the apparatus and lost, and for adding said overflow carries developed upon each of said y successive cycles back at the least significant bit position of the next cycle developed one of said partial carries;

whereby said overflow carry means does potentially modify said final product by said adding as performed on said final, y'th cycle, partial carry;

whereby said overflow array means does assure that said final product will be correct even should the bit pattern of said $(x \cdot 2^z)$ bit multiplicand, when multiplied upon a succession of cycles to said $(y \cdot 2^z)$ bit multiplier, be such in comparison to the actual physical aggregate $(x \cdot 2^z)$ bit width of aggregate said 0'th RANK ADDER means that ones of successive said partial products would, forebearing the operation of said overflow array means, have produced, save for the fact that the the least significant $2^z$ bits of said partial product is right shifted physically without the boundaries of said apparatus, an overflow carry which would have been detectable in the partial product of a subsequent cycle, and thence would have been detectable in said final product;

whereby said overflow carry means does thusly assure the correct operation as regards overflows of the apparatus for all patterns of multiplicand less than or equal to $(z \cdot 2^z)$ bits and all patterns of multiplier less than or equal to $(y \cdot 2^z)$ bits.

10. The digital logic apparatus as set forth in claim 9 wherein:

$x=8$;
$y=5$; and
$z=3$;

whereby said binary multiplicand is less than or equal to $(x \cdot 2^z)=64$ bits in length;

whereby said binary multiplier is less than or equal to $(y \cdot 2^z)=40$ bits in length;

whereby said digital logic apparatus is organized as an array assembly of $x=8$ identical subassemblies;

whereby each of said 8 identical subassemblies consists of $2^{z-1}=4$ successive ranks;

whereby said binary multiplication is performed in $y=5$ successive cycles;

whereby said equal parts of said multiplier are in number $y=5$ of $2^z=8$ bits each;

whereby said MULTIPLICAND SELECTOR means does select $x=8$ successive one-bit-overlapping $((2^{z+1})=9)$-bit-each multiplicand parts;

whereby said MULTIPLICAND SELECTOR means does further distribute one-bit-overlapping three-bit-each multiplicand subparts of number $(z+1)=4$ which are the sequence (0,1,2), (2,3,4), (4,5,6) and continuing to $((2^z-1)=7, 2^z=8, 2^z+1=9)$;

whereby said MULTIPLIER SELECTOR means does select upon each of said $y=5$ successive cycle parts of $2^z=8$ bits each from said multiplier;

whereby said MULTIPLIER PREPROCESSOR does preprocess successive said $2^z=8$ bit multiplier parts in order to generate a $2^z=8$ bit preprocessed multiplier part;

whereby said preprocessed multiplier part distribution means does distribute $2^{z-1}=4$ successive two bit pairs of said preprocessed multiplier part;

whereby said $x=8$ identical subassemblies each of $2^{z-1}=4$ successive ranks are for multiplying in ones complement format upon each of $y=5$ successive cycles successive said preprocessed multiplier parts to the entire said multiplicand;

whereby said MULTIPLICAND SELECTOR RANK N means within each of said $x=8$ identical subassemblies are in number equal to $(z+1)=4$, and are responsive to the binary value of successive two bit pairs of said total $2^{z-1}=4$ two bit pairs of said preprocessed multiplier part;

whereby said RANK ADDER means within each of said $x=8$ identical subassemblies are in number equal to $(z+1)=4$, and do form a sum and a carry from the $(z+1)$'th=4'th rank which sum is said partial product and which carry is said partial carry;

whereby said partial product SUM REGISTER holding means will right shift each held said partial product $2^z=8$ bits upon provision bad to the 0'th rank ones of said RANK ADDER means and will after said $y=5$ successive cycles hold said final partial product;

whereby said partial CARRY REGISTER holding means will right shift each held said partial carry $2^z=8$ bits upon provision back to the 0'th rank ones of said RANK ADDER means, and will after said $y=5$ successive cycles hold said final partial carry.

11. The digital logic apparatus as set forth in claim 9 wherein:

$x=5$;
$y=5$; and
$z=3$;

whereby said binary multiplicand is less than or equal to $(x \cdot 2^z)=40$ bits in length;

whereby said binary multiplier is less than or equal to $(y \cdot 2^z)=40$ bits in length;

whereby said digital logic apparatus is organized as an array assembly of $x=5$ identical subassemblies;

whereby each of said $x=5$ identical subassemblies consists of $2^{z-1}=4$ successive ranks;

whereby said binary multiplication is performed in $y=5$ successive cycles;

whereby said equal parts of said multiplier are in number $y=5$ of $2^z=8$ bits each;

whereby said MULTIPLICAND SELECTOR means does select $x=5$ successive one-bit-overlapping $((2^z+1)=9)$-bit-each multiplicand parts;

whereby said MULTIPLICAND SELECTOR means does further distribute one-bit-overlapping three-bit-each multiplicand subparts of number $(z+1)=4$ which are the sequence (0,1,2), (2,3,4), (4,5,6) and continuing to $((2^z-1)=7, 2^z=8, 2^z+1=9)$;

whereby said MULTIPLIER SELECTOR means does select upon each of said $y=5$ successive cycle parts of $2^z=8$ bits each from said multiplier;

whereby said MULTIPLIER PREPROCESSOR does preprocess successive said $2^z=8$ bit multiplier parts in order to generate a $2^z=8$ bit preprocessed multiplier part;

whereby said preprocessed multiplier part distribution means does distribute $2^{z-1}=4$ successive two bit pairs of said preprocessed multiplier part;

whereby said $x=5$ identical subassemblies each of $2^{z-1}=4$ successive ranks are for multiplying in one's complement format upon each of $y=5$ successive cycles successive said preprocessed multiplier parts to the entire said multiplicand;

whereby said MULTIPLICAND SELECTOR RANK N means within each of said $x=5$ identical subassemblies are in number equal to $(z+1)=4$, and are responsive to the binary value of successive two bit pairs of said total $2^{z-1}=4$ two bit pairs of said preprocessed multiplier part;

whereby said RANK ADDER means within each of said $x=5$ identical subassemblies are in number equal to $(z+1)=4$, and do form a sum and a carry from the $(z+1)$'th=4'th rank which sum is said partial product and which carry is said partial carry;

whereby said partial product SUM REGISTER holding means will right shift each held said partial product $2^z=8$ bits upon provision back to the 0'th rank ones of said RANK ADDER means and will after said $y=5$ successive cycles hold said final partial product;

whereby said partial CARRY REGISTER holding means will right shift each held said partial carry $2^z=8$ bits upon provision back to the 0'th rank ones of said RANK ADDER means, and will after said $y=5$ successive cycles hold said final partial carry.

12. The digital logic apparatus as set forth in claim 9 wherein said x identical subassemblies each of $(z+1)$ successive ranks, which each subassembly does in said MULTIPLICAND SELECTOR RANK N means thereof manipulate said $(z+1)$ multiplicand subparts which are of said sequence (0,1,2), (2,3,4,), (4,5,6,), and continuing to $(2^z-1, 2^z, 2^z+1)$ thusly making that $(x \cdot 2^z)$ bits of multiplicand meaning the entire said multiplicand are manipulated in entire said x identical subassemblies, are further augmented, said augmented x identical subassemblies comprising:

x identical subassemblies each of $(z+1)$ successive ranks which are each one in said $(z+1)$ MULTIPLICAND SELECTOR RANK N means there in for manipulating $(z+1)$ multiplicand subparts PLUS, in augmentation, additional said identical subassemblies and/or fractionally wide portions thereof said subassemblies as occupy $2^z$ additional most significant bit positions, meaning that aggregate said additional subassemblies and/or fractional parts thereof do in aggregate have aggregate bit inputs, which aggregate bit inputs are called sign fill bit inputs, to said (z+1) MULTIPLICAND SELECTOR RANK N means which are in bit number equal to $2^z$;

and which digital logic apparatus further comprises:

multiplicand fill bit means for monitoring each successive said two bit pair of said preprocessed multiplier part by second-detecting any binary 11 condition in each successive two bit pair of said preprocessed multiplier part and, responsively to said second-detecting maintaining correct said sign fill bit inputs to said additional subassemblies as does permit of proper sign extension as is utilized in floating point multiplication.

13. An apparatus for performing a binary multiplication in one's complement format comprising:

MULTIPLICAND SELECTOR means for selecting and distributing one-bit-overlapping three-bit multiplicand parts of the entirety of a multiplicand quantity;

MULTIPLIER SELECTOR means for selecting and distributing two-bit multiplier parts of the entirety of a multiplier quantity;

MULTIPLIER PREPROCESSOR means for receiving and preprocessing each successive said two-bit multiplier part by sequentially detecting each binary 11 condition in each successive said two-bit multiplier part and adding a binary one as a carry quantity to the least significant bit position of the next more significant said two-bit multiplier part only if a binary 11 is detected, else doing nothing to said next more significant two-bit-part, producing thereby successive 2-bit preprocessed multiplier parts;

a plurality of MULTIPLICAND SELECTOR means each responsive to the binary value of a corresponding successive one of said two-bit said preprocessed multiplier parts for receiving and manipulating and transferring successive associated ones of said 3-bit multiplicand parts in the manner corresponding to the following binary values;

00 convert the 3-bit multiplicand part to 3 binary 0's and transfer 01 transfer the 3-bit multiplicand part as is 10 left-shift the 3-bit multiplicand part 2 bit positions and transfer 11 Form the one's complement of the 3-bit multiplicand part and transfer, transferring thereby 3-bit manipulated multiplicand parts;

ADDER means for receiving and for adding each successive manipulated 3-bit multiplicand part as transferred to next successive said manipulated multiplicand-parts as transferred, producing thereby successive 3-bit partial sums and partial carries, until all said multiplicand parts have been added in a one's complement format, thusly producing a one's complement final sum which is a one's complement final partial product;

CARRY ADDER means for holding the successive ones of partial carries as are developed in said ADDER means during the addition of successive ones of the 3-bit manipulated multiplicand parts in order to form a sum quantity, which quantity is a final partial carry to said final partial product;

full final adder means for adding such final partial product and said final partial carry in order to produce a one's complement final sum, which is a final product of said multiplicand quantity multiplied by said multiplier quantity.

14. An apparatus for performing a binary multiplication in one's complement format as set forth in claim 13 which, between said CARRY ADDER means and said full final adder means, further comprises:

final partial carry correction means for converting said one's complement format final partial carry to a two's complement format final partial carry;

whereby because said final product is produced by said addition in said full final adder means of said final partial product and said final carry, such final product is converted into two's complement format.

* * * * *

UNITED STATES PATENT AND TRADEMARK OFFICE
CERTIFICATE OF CORRECTION

PATENT NO. : 4,484,301

DATED : November 20, 1984

INVENTOR(S) : William L. Borgerding, Vithal R. Patel

It is certified that error appears in the above-identified patent and that said Letters Patent are hereby corrected as shown below:

Column 16, Line 47, after "rank" insert -- which -- .

Column 19, Line 57, "and" should be -- said -- .

Column 20, Line 46, delete third "the".

Signed and Sealed this

Seventh Day of May 1985

[SEAL]

*Attest:*

DONALD J. QUIGG

*Attesting Officer*  *Acting Commissioner of Patents and Trademarks*